Jan. 20, 1959   J. I. YELLOTT ET AL   2,869,677
DUNLAB TUBE SEPARATORS AND COOLANT MEANS THEREFOR
Original Filed Nov. 23, 1951
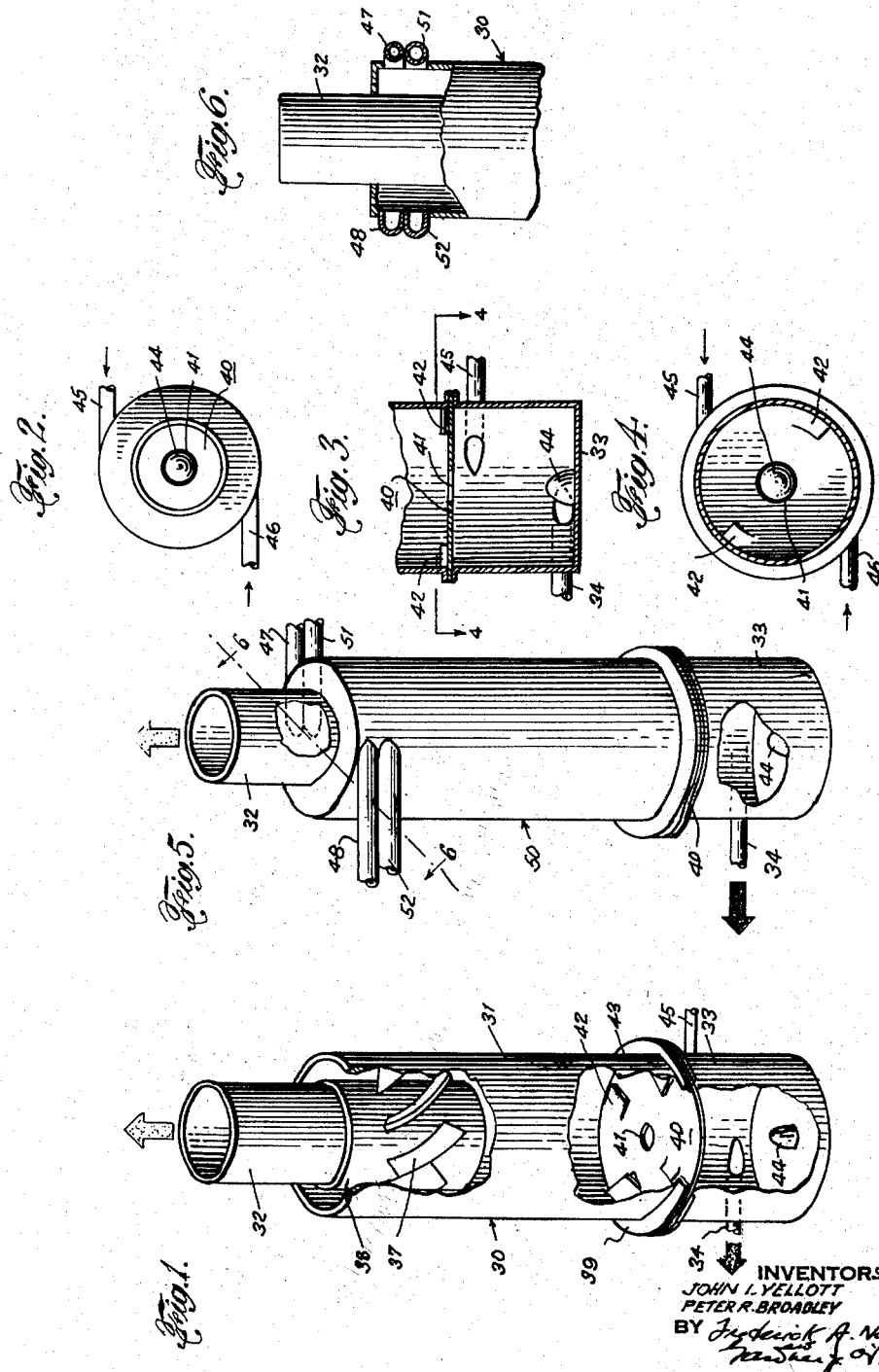
INVENTORS
JOHN I. YELLOTT
PETER R. BROADLEY
BY
ATTORNEYS

United States Patent Office 2,869,677
Patented Jan. 20, 1959

2,869,677

DUNLAB TUBE SEPARATORS AND COOLANT MEANS THEREFOR

John I. Yellott, New York, N. Y., and Peter R. Broadley, Elizabeth, N. J., assignors to Bituminous Coal Research, Inc., Washington, D. C., a corporation of Delaware Original application November 23, 1951, Serial No. 257,702. Divided and this application February 14, 1955, Serial No. 488,076

2 Claims. (Cl. 183—5)

This invention relates to pressure-sustaining, reverse flow vortical whirl separators incorporating means for the continuous pneumatic blowdown and removal of separated particles from the separators in fractional amounts of the particle-bearing gasiform fluid being processed. More particularly, the invention is directed to such separators incorporating coolant gas addition means, and particularly adapted for the treatment of high temperature (1500° F.), pressurized gasiform fluids entraining incandescent particulate material which is to be separated, quenched, and removed from the separators in blowdown streams essentially comprised of added coolant gas, and without materially affecting and reducing the temperature of the original gasiform fluid. This application is a division of our application Serial No. 257,702, filed November 23, 1951, for Vortical Whirl Separators and Method of Operation, the novel, continuous pneumatic blowdown type, pressure-sustaining, reverse flow vortical whirl separators, which we designate generally by the trade name of "Dunlab Tube."

The trade name "Dunlab Tube" has been adopted by us to designate our improved pressure-sustaining, reverse flow, vortical whirl separators, in which particulate material is separated from entraining gasiform fluids, with continuous removal of the particulate material, in statu separandi, in blowdown streams comprising minute fractional portions of the gasiform fluid, all as set out and claimed in our said parent application, supra.

Our "Dunlab Tubes," as set forth and illustrated in our said parent application, are susceptible of a number of modifications, the essential and controlling feature of all types being the separation of particulate matter from a spinning or vortically whirling carrier gas stream, with the reverse flow return of cleaned gas, and the continuous pneumatic removal of the separated particulate matter, as separated, in blowdown streams comprised of relatively small fractions (0.5–10%) of the original gas stream.

The present divisional application is directed to a special form of "Dunlab Tube" separator in which coolant air is introduced as a coflowing sheath stream in either or both the primary and secondary separator sections, and the separated solids are centrifugally transferred and projected into the sheath stream from a high temperature core stream, and the solids are quenched and continuously removed in blowdown streams of the added coolant gas. The use of coolant air for such purposes is disclosed and claimed in Patent No. 2,650,675 of September 1, 1953, for Method of and Apparatus for the Separation of Particulate Material From Entraining Gaseous Fluids, issued to John I. Yellott. In the said Yellott patent, a straight-through, Western Precipitator type of vortical whirl separator is disclosed, and the operating characteristics and functioning of such tubes are sufficiently different from those of the continuous blowdown, reverse flow "Dunlab Tubes," that the present improvements were arrived at only as a result of considerable thought and experimentation.

As indicated hereinabove, the utilization of coolant gas, as described herein, permits the primary, high-temperature, incandescent particle-bearing gas to be stripped of contained ash and incompletely burned combustible particles, and without loss of any appreciable or significant volume of the high-temperature gas. In coal-burning, gas-turbine power plants, where superheated air (<1350° F.) is used as a pressurized motive fluid, the saving of the aliquot fraction normally expended for blowdown purposes is desirable, particularly where the tonnage of the treated is considerable, and the cost of heating is significant. The use of low-temperature ambient air as a coolant, involves merely the handling of the same, which can be done by pumps or fans.

The coolant air or other gasiform fluid, as noted, can be introduced into our "Dunlab Tube" type separators, either with the dirty gas input or immediately before the blowdown stage, and permits quenching of highly heated particulate solids in the separators, as opposed to our prior findings and teachings, which taught the addition of coolant gases to blowdown streams, after they were introduced into blowdown discharge manifolds which discharged into ash concentrators.

It is, therefore, among the features of novelty and invention of the present invention to provide improved continuous pneumatic blowdown type, pressure-sustaining, reverse flow vortical whirl separators particularly adapted for high-temperature (ca. 1500° F.) use, and embodying coolant introducing means, whereby separated, superheated, incandescent and incompletely combusted combustible particles, are quenched, in statu separandi, in the separators, and before removal in pneumatic blowdown streams.

Further features of novelty and advantage of this invention include "Dunlab Tube" type vortical whirl separators embodying coolant gas inlet means, which means can be incorporated in the primary or secondary separation stages of the separators, and are adapted to introduce coolant gas as sheath streams coflowing with the core streams of particle-laden gas.

With these and other objects in view, which may be incident to our improvements, the invention consists in the parts and combinations to be hereinafter set forth and claimed, with the understanding that the several necessary elements, comprising our invention, may be varied in construction, proportions and arrangement, without departing from the spirit and scope of the appended claims.

In order to make our invention more clearly understood, we have shown in the accompanying drawings means for carrying the same into practical effect, without limiting the improvements in their useful applications to the particular constructions, which for the purpose of explanation, have been made the subject of illustration.

In the drawings, like numerals refer to similar parts throughout the several views, of which:

Figure 1 is an elevation, partly in broken section, of a pressure-sustaining, reverse flow vortical whirl separator having a spinner inlet, an axial cleaned air return pipe outlet, a primary separator chamber, and a secondary separator or dischrge chamber with a tangential coolant air inlet and a tangential blowdown line, together with an intermediate diaphragm incorporating an axial breather hole and peripheral skimmer blades;

Fig. 2 is a plan view of a vortical whirl separator with a cold air inlet and a blowdown line for the secondary or discharge chamber;

Fig. 3 is a fragmentary vertical section of the lower part of the separator of Fig. 1, showing the base of the separator barrel and the discharge or secondary separator chamber with a separate cold air inlet;

Fig. 4 is a horizontal cross-section taken on line 4—4 of Fig. 3, showing the diaphragm;

Fig. 5 is an elevation of a separator with separate tangential inlets to the primary separator section for dust-bearing gas and coolant air, respectively; and Fig. 6 is a vertical section through the separator of Fig. 5.

Turning now to the drawings, and more particularly to the showing of Fig. 1, the individual vortical whirl separator tubes 30, as shown more in detail in Fig. 2, have barrel sections 31 mounting reverse flow axial cleaned air discharge tubes 32. Secondary separation or discharge chambers 33 are secured to the bases of the barrel sections, diaphragm or razor plates 40 being secured therebetween. The secondary chambers 33 are provided with separate pneumatic discharge means for separated ash comprising blowdown lines 34 discharging to blowdown manifold 35, from whence the ash is pneumatically purged from the system through critical flow nozzle 36, whereby there is a uniform pressure maintained in the separators, with no blowback therebetween due to differential discharge pressures in the blowdown lines.

The spinner type inlet separators herein, as shown in Fig. 1, have a plurality of deflector vanes 37 mounted on an annulus 38 which is fitted over the axial cleaned air discharge tube 32, and maintains the vanes 37 in place in the mouth of barrel sections 31. Usually the vanes are mounted to present an exit or discharge angle of 30°.

The barrels 31 and discharge chambers 33 may be flanged, as indicated generally at 39, to receive the razor plates 40. These members have a central aperture 41, and a plurality of peripheral, upstruck blades or skimmers 42, defining discharge apertures 43 leading from the primary separation chamber in barrel 31 to the secondary separation or discharge chamber 33. The blades are preferably sharpened, and may have any suitable shape, such as spoon or scoop, and can be oriented in any manner found desirable to effect the maximum separation or particulate material from the primary gasiform fluid stream which is projected against the skimmer plate as a helically advancing sheath stream in contact with the inner wall of the primary barrel or separator chamber. The blades 42 are usually two or four in number, and no significant difference in results is observable between them. The pneumatic blowdown lines 34, as shown, are tangential to the walls of the chambers 33 at the base thereof. Because of the tight vortex action of the secondary cleaned air, there is an appreciable erosion or abrasion of the bases of the chambers 33, at the axes thereof, and wear members, such as conical wear member 44, may be mounted at such axes to eliminate or mitigate this condition. While the invention comprehends the use of fixed wear members, it will be understood that spinning or rotatable members may be used without departing from the spirit and scope of the invention.

A desideratum in the operation of the improved separators of the type herein considered is the imparting of a relatively flat helical flow to the incoming dust or solids-laden air or gas. The separator of Fig. 5 has a closed barrel 50 mounting the usual axial cleaned air reverse flow discharge pipe 32. A razor plate 40 and secondary separator or discharge chamber 33 are subjoined in the usual manner. In this form, balanced flow of inlet gases is secured by providing a pair of opposed, tangential inlet ducts 51, 52 at the top of the barrel section.

In Patent 2,650,675, issued September 1, 1953, to John I Yellott, for Ash Removal System With Cold Air Quench, there has been shown apparatus for supplying quenching coolant gas, as a sheath stream, to a spinning core stream of hot particle-containing gas, whereby the hot particles are projected into and quenched by the sheath stream, and asported thereby. By providing a separate discharge line for the coolant fluid, of equal capacity to the coolant inlet line, there is substantially no mixing of the core and sheath streams, with a resultant dilution and cooling of the core stream. Thus, the core stream, which is to serve as a turbine motive fluid, is kept at its maximum operating temperature, in any particular installation. Use of what may be termed the "ash transfer principle" of the said Yellott patent is possible in the apparatus of the present invention in two ways: (1) in the apparatus illustrated in Figs. 1, 2, 3, and 4, cold air is introduced into the discharge chamber or secondary separator 33 through opposed tangential inlets 45, 46; (2) in the device illustrated in Figs. 5 and 6, the coolant air is introduced into the primary separator chamber through opposed tangential inlets 47, 48, disposed above the level of the tangential primary air inlets 51, 52.

It will be readily apparent that the improved reverse flow vortical whirl separators herein are susceptible of use in a wide variety of industrial and technical installations, a preferred use being the continuous separation and pneumatic removal of combustion residues resulting from the pressurized combustion of pulverized coal in the generation of high temperature motive fluid gas turbines. Where high temperatures are involved, as in combustion systems, the invention comprehends the use of auxiliary coolant gasiform fluid streams, coflowing in enveloping relation to the self-purging, heated particle-bearing streams, to receive, quench, asport and pneumatically discharge the separated particles, whereby the hot cleaned gas is separately removed to a use device substantially in its original volume and without appreciable lowering in temperature. The method of operation of the novel devices herein will be susceptible of many variations, as is evident from a study of the specification and drawings.

There has been described and illustrated a device capable of performing all of the specifically mentioned objects of this invention as well as others which are apparent to those skilled in the art. Various uses of the present invention may be made employing the described structure. Accordingly, it is apparent that variations as to operation, size and shape, and rearrangement of elements may be made without departing from the spirit of the invention. Accordingly, limitation is sought only in accordance with the scope of the following claims.

What is claimed is:

1. A pressure-sustaining, reverse flow, vortical whirl separator of the character described for high temperature use, and particularly adapted for the continuous pneumatic removal and simultaneous quenching of incandescent, incompletely burned combustible particles, and combustion residues, comprising a bottomed body section, a whirl-imparting dirty gas entrant means an axial, reverse flow, cleaned gas return means, a separated solids pneumatic blowdown means, and a separate vortical whirl-imparting coolant gas entrant means located adjacent to and upstream of the blowdown means, whereby when a heated, incandescent particle-bearing, pressurized gas stream is introduced into the separator through the first said entrant means, and a pressurized coolant gas stream is introduced into the separator through the second said entrant means, the particulate material is centrifugally separated from the heated carrier stream and projected into and quenched by the coolant gas stream, the cleaned heated carrier gas is discharged from the separator through the cleaned gas return means, and the separated and quenched particles are continuously pneumatically removed from the separator through the pneumatic blowdown means in a blowdown stream of the said coolant gas.

2. A pressure-sustaining, reverse flow, vortical whirl separator of the character described for high temperature use, and particularly adapted for the continuous pneumatic removal and simultaneous quenching of incandescent, incompletely burned combustible particles, and combustion residues, comprising a bottomed body section, divider means in the separator to form a first separator zone, and a second separator zone in peripheral and axial fluid communication with the first said zone, a whirl-imparting dirty gas entrant means, an axial, reverse flow, cleaned gas return means, a separated solids pneumatic blowdown means, comprising a blowdown line tangentially embouched in the separator wall of the second zone adjacent the bottom, and a separate vortical whirl-imparting coolant gas entrant means embouched in the second separator zone, whereby when a heated, incandescent particle-bearing, pressurized gas stream is introduced into the separator through the first said entrant means, and a pressurized coolant gas stream is introduced into the separator through the second said entrant means, the particulate material is centrifugally separated from the heated carrier stream and projected into and quenched by the coolant gas stream, the cleaned heated carrier gas is discharged from the separator through the cleaned gas return means, and the separated and quenched particles are continuously pneumatically removed from the separator through the pneumatic blowdown means in a blowdown stream of the said coolant gas.

References Cited in the file of this patent

UNITED STATES PATENTS

| | | |
|---|---|---|
| 418,836 | Allington | Jan. 7, 1890 |
| 769,808 | Venderbush et al. | Sept. 13, 1904 |
| 1,928,702 | O'Mara | Oct. 3, 1933 |
| 2,582,423 | Foley | Jan. 15, 1952 |
| 2,638,181 | Gordon | May 12, 1953 |
| 2,650,675 | Yellott | Sept. 1, 1953 |
| 2,681,124 | Van der Kolk | June 15, 1954 |

FOREIGN PATENTS

| | | |
|---|---|---|
| 658,471 | Great Britain | Oct. 10, 1951 |